United States Patent
Onuma

(10) Patent No.: US 6,657,824 B1
(45) Date of Patent: Dec. 2, 2003

(54) MAGNETORESISTIVE EFFECT MAGNETIC HEAD, ROTARY MAGNETIC HEAD APPARATUS, AND MANUFACTURING METHOD THEREOF

(75) Inventor: Kazunori Onuma, Miyagi (JP)

(73) Assignee: Sony Corporation, Tokyo (JP)

( * ) Notice: Subject to any disclaimer, the term of this patent is extended or adjusted under 35 U.S.C. 154(b) by 390 days.

(21) Appl. No.: 09/689,555

(22) Filed: Oct. 12, 2000

(30) Foreign Application Priority Data

Oct. 13, 1999 (JP) .......................................... P11-291533

(51) Int. Cl.$^7$ ................................................. G11B 5/39
(52) U.S. Cl. ...................................... 360/319; 360/271
(58) Field of Search ................................ 360/319, 126, 360/317, 313, 270, 271

(56) References Cited

U.S. PATENT DOCUMENTS

| | | | |
|---|---|---|---|
| 5,850,325 A | 12/1998 | Miyauchi et al. | |
| 6,185,078 B1 * | 2/2001 | Lin et al. ............... | 360/324.12 |
| 6,198,609 B1 * | 3/2001 | Barr et al. .................. | 360/322 |
| 6,333,842 B1 * | 12/2001 | Nobuyuki et al. ....... | 360/324.2 |
| 6,452,760 B1 * | 9/2002 | Inaguma et al. ........... | 360/319 |

FOREIGN PATENT DOCUMENTS

| JP | 2-226509 | * 9/1990 |
|---|---|---|
| JP | 11213334 | 8/1999 |

* cited by examiner

Primary Examiner—David L. Ometz
(74) Attorney, Agent, or Firm—Sonnenschein, Nath & Rosenthal LLP

(57) ABSTRACT

It is assumed that W1 is the width for an end face of the lower magnetic shield thin film 4 which is exposed outward from the tape sliding surface 1a. It is also assumed that W2 corresponds to the sum of the width for an end face of the MR element 7 which is exposed outward from the tape sliding surface 1a and widths for end faces of a pair of ferromagnetic films 9 and 10 which are exposed outward therefrom. The width W1 is determined to be smaller than W2. When the MR head 1 is mounted on the head support plate 30 or the rotary drum 42, it is possible to use as a marker the lower magnetic shield thin film 4's end face exposed from the tape sliding surface.

1 Claim, 8 Drawing Sheets

MAGNETORESISTIVE EFFECT MAGNETIC HEAD, ROTARY MAGNETIC HEAD APPARATUS, AND MANUFACTURING METHOD THEREOF

RELATED APPLICATION DATA

The present application claims priority to Japanese Application No. P11-291533 filed Oct. 13, 1999, which application is incorporated herein by reference to the extent permitted by law.

BACKGROUND OF THE INVENTION

1. Technical Field

The present invention relates to a magnetoresistive effect magnetic head which reads signals recorded on a magnetic recording medium by using magnetoresistive effect. The present invention also relates to a rotary magnetic head apparatus using the magnetoresistive effect magnetic head and to a manufacturing method of this rotary magnetic head apparatus.

2. Prior Art

In recent years, recording densities are increasing in the field of magnetic recording. Instead of bulk heads, thin film heads are widely used as magnetic heads suited for high density recording. A thin film head is manufactured through the use of manufacturing techniques in the field of semiconductor integrated circuits, more specifically film formation techniques such as vaporization, sputtering, and the like, and photolithography techniques such as photoengraving, etching, and the like. These techniques make it possible to form a fine shape with high precision to mass-produce heads. Thin film heads having these advantages are currently mainstreamed as magnetic heads for high-density recording/reproducing systems such as hard disks, tape streamers, and the like.

Of these thin film heads, a magnetoresistive effect magnetic head (referred to hereafter as an MR head) is now in wide use as a magnetic reproducing head on hard disk drives and the like. The MR head reads signals using magnetoresistive effect.

A magnetoresistive effect element (referred to hereafter as an MR element) provides the magnetoresistive effect. The MR head comprises the MR element formed in a gap according to the thin film formation. The width of a thin film MR element determines the track width, easily providing narrow tracks. The MR head provides higher read sensitivity than a coil-type inductive head. Owing to no influence of inductance, the MR head can transfer signals at high-frequencies. The MR head is considered to be an essential device for high-density recording/reproducing systems in the future.

The following describes a configuration example of a magnetic head conventionally used for a hard disk drive with reference to FIGS. 1 through 3. A magnetic head 100 is formed as a so-called composite magnetic head comprising an MR head for reproduction and an inductive head for recording which are layered on each other. The magnetic head 100 is mounted on a floating slider 200 which floats above a magnetic disk. The magnetic head 100 is positioned so that a magnetic sensor is exposed from an air bearing surface (ABS) 201 of a floating slider 200 to a magnetic disk's signal recording surface.

Specifically, the magnetic head 100 is provided with a substrate 102 made of Al—TiC and the like on which a base film 101 made of $Al_2O_3$ and the like is formed. On the substrate 102 where the base film 101 is formed, there is formed a soft magnetic film of Sendust and the like which functions as a lower magnetic shield thin film 103. A nonmagnetic nonconductive film 104 of $Al_2O_3$ and the like is formed on the substrate 102 where the lower magnetic shield thin film 103 is not formed. The nonmagnetic nonconductive film 104 is as thick as the lower magnetic shield thin film 103.

Another nonmagnetic nonconductive film of $Al_2O_3$ and the like is formed on the lower magnetic shield film 103 and the nonmagnetic nonconductive film 104 to function as a lower shield gap film 105. On the lower shield gap film 105, an SAL bias layer, an intermediate layer, and an MR layer are laminated to form an MR element 106. The MR element 106 is positioned at one side (a face against a medium) of the magnetic head 100 so that one end of the MR element 106 is exposed outward from the air bearing surface 201 of the floating slider 200.

On both ends of the MR element 106 in the track direction, there is formed a pair of ferromagnetic films 107 and 108 for making a magnetic domain for the MR element 106 to be single-domain and suppressing a Barkhausen noise. On the ferromagnetic films 107 and 108, there is formed a pair of resistance decreasing films 124 and 125 for decreasing resistance of the MR element 106 and a portion electrically connected to the MR element 106.

On the lower shield gap film 105, there is provided a pair of conductors 109 and 110 for supplying the MR element 106 with a sense current. One end of the conductors 109 and 110 is connected to a pair of ferromagnetic films 107 and 108. The pair of conductors 109 and 110 is electrically connected to the MR element 106 via the pair of ferromagnetic films 107 and 108.

On the other end of the pair of conductors 109 and 110, there are provided external connection terminals 111 and 112 which are connected to an external circuit. End faces of the external connection terminals 111 and 112 are exposed outward. Lead wires and the like are connected to these end faces.

On the lower shield gap film 105, there are formed the MR element 106, the ferromagnetic films 107 and 108, the conductors 109 and 110, and the like. In a manner which covers these elements, a nonmagnetic nonconductive film of $Al_2O_3$ and the like is also formed on the lower shield gap film 105 and functions as an upper shield gap film 113. On the upper shield gap film 113, a soft magnetic film of Permalloy and the like is formed and functions as an upper magnetic shield thin film 114.

The above-mentioned portions on the magnetic head 100 constitute an MR head for reproduction. The magnetic head 100 allows the soft magnetic film in the form of the upper magnetic shield thin film 114 to function as a lower-layer core for the inductive head for recording. Namely, the soft magnetic film of Permalloy and the like formed on the upper shield gap film 113 functions as an upper magnetic shield thin film for the MR head and as a lower-layer core for the inductive head.

The soft magnetic film functions as a lower-layer core for the inductive head. A nonmagnetic nonconductive film of $Al_2O_3$ and the like is formed on the soft magnetic film and is used as a recording gap film 115. On the recording gap film 115, a thin film coil 117 is formed at a position far away from a face against a medium so that the coil 117 is embedded in an insulating film 116. As shown in FIG. 1, the coil 117 is connected to a pair of conductors 118 and 119 and external connection terminals 120 and 121 through which a drive current is supplied.

A soft magnetic film of Permalloy and the like is formed on the recording gap film 115 from a position facing a medium to a position far away from that position. The soft magnetic film functions as an upper-layer core 122.

Namely, at the side facing a medium on the magnetic head 100, there is provided the recording gap film 115 sandwiched by the lower-layer core 114 and the upper-layer core 122 which face to each other. At a position far away from the side facing a medium, the coil 117 is provided between the lower-layer core 114 and the upper-layer core 122. The soft magnetic film functions as the upper-layer core 122 on the magnetic head 100. At a position farthest from the face against a medium, the upper-layer core 122 is connected to the soft magnetic film functioning as the lower-layer core 114.

The above-mentioned portions on the magnetic head 100 constitute an inductive head for recording. As the top layer on the magnetic head 100, there is formed a nonmagnetic nonconductive film of $Al_2O_3$ and the like functioning as a protection layer 123.

The magnetic head 100 according to the above-mentioned configuration is formed at the side of the floating slider 200 so that the face against the medium is positioned at the side of the air bearing surface 201 of the floating slider 200. When the floating slider 200 floats above a magnetic disk, the magnetic head 100 reads or writes signals onto the magnetic disk. At this time, part of the MR element 5 in the MR head as the magnetic sensor and part of the recording gap film 115 as the inductive head are positioned opposite to the signal recording surface of the magnetic disk.

Tape mass storage systems use magnetic tapes as recording media. Some tape mass storage systems employ a reproducing/recording technology called the helical scan technology. The helical scan technology comprises a fixed drum and a rotary drum which is rotatively mounted against the fixed drum. The helical scan technology records or reproduces signals on a magnetic tape by using a rotary magnetic head apparatus whose magnetic head is mounted on a rotary drum. The magnetic tape is helically wound on an external surface of the rotary magnetic head apparatus. As the rotary drum rotates, the magnetic head moves and slides touchingly across the magnetic tape for recording or reproducing signals on the magnetic tape.

According to the helical scan technology, the magnetic head touchingly slides across the running magnetic tape at a high speed for recording and reproducing signals. This provides a fast relative slide speed between the magnetic tape and the magnetic head, improving a data transfer rate.

In recent years, a technology is proposed to use an MR head as a reproducing head, narrow recording tracks, and record and reproduce signals at an increased recording density for tape mass storage systems according to the helical scan technology.

In tape mass storage systems according to the helical scan technology, the magnetic head touchingly slides across the magnetic tape at a high speed, making it necessary to implement countermeasures against abrasion of the magnetic head. FIGS. 4 and 5 show an MR head used as a reproducing head for a tape mass storage system according to the helical scan technology. The MR head is so structured that the MR element 106 and the like is sandwiched and protected by a pair of guard materials 131 and 132.

As a recording medium, the helical scan tape system uses a magnetic tape which is highly coercive and has a thicker magnetic recording layer than that of a magnetic disk. As a recording head, it is necessary to use a bulk-type magnetic head which uses a core material with a high saturation flux density. Accordingly, a reproducing MR head is configured as an independent head element separated from the recording head.

When the MR head is configured as an independent head element, there is a problem of difficulty in positioning when mounting the MR head on the rotary drum. When the MR head is used as a reproduction head in the helical scan tape system, the MR head needs to be accurately mounted on a head support plate by positioning so that the MR element 106 as the magnetic sensor is positioned optimally. It is also necessary to accurately mount the head support plate equipped with the MR head on the rotary drum by positioning so that the MR element 106 as the magnetic sensor is positioned optimally.

However, the MR element 106 is very thin, namely approximately 0.1 $\mu$m. It is very difficult to directly recognize the MR element 106 using an image. With respect to the above-mentioned composite magnetic head 100 as shown in FIG. 2, the relatively thick upper-layer core 122 for the recording head is formed just above the MR element 106. The upper-layer core 122 can be used as a marker and serve as a reference for positioning. However, the MR head used as a reproducing head in the helical scan tape system is configured as an independent head element separated from the recording head. Unlike the composite magnetic head 100, it is impossible to use the upper-layer core 122 of the recording head as a marker.

For such an MR head, it is possible to consider using the lower magnetic shield thin film 103 or the upper magnetic shield thin film 114 as a marker. These films can be used as references for positioning. Namely, the lower magnetic shield thin film 103 or the upper magnetic shield thin film 114 is formed so that its center in the width direction matches the center of the MR element 106 in the width direction. It is possible to identify the center of the lower magnetic shield thin film 103 or the upper magnetic shield thin film 114 in the width direction to be the center of the MR element 106 in the width direction, namely the track center for accurate positioning.

As shown in FIG. 5, if a width W100 of the lower magnetic shield thin film 103 or a width W101 of the upper magnetic shield thin film 114 is too large on the MR head, however, it is impossible to simultaneously recognize both ends of the lower magnetic shield thin film 103 or the upper magnetic shield thin film 114 in the width direction with regard to a visual field for image recognition. In this case, it is necessary to identify the center of the lower magnetic shield thin film 103 or the upper magnetic shield thin film 114 in the width direction, namely the center of the MR element 106 in the width direction by measuring a distance from one end of the lower magnetic shield thin film 103 or the upper magnetic shield thin film 114 in the width direction. Such a measurement makes it difficult to accurately determine the center of the MR element 106 in the width direction and degrades positioning accuracy because of a tapered shape at the end of the lower magnetic shield thin film 103 or the upper magnetic shield thin film 114 in the width direction or because of a long distance to be measured.

BRIEF SUMMARY OF THE INVENTION

The present invention has been made in consideration of the foregoing. It is therefore an object of the present invention to provide an MR head which is capable of improving the positioning precision for the head support plate and the rotary drum and is suitable for the helical scan technology as a reproduction head. It is another object of the present invention to provide a rotary magnetic head apparatus using such an MR head and a manufacturing method of the rotary magnetic head apparatus.

A magnetoresistive effect magnetic head according to the present invention forms an inter-shield gap between joint surfaces for a pair of guard materials through the intermediation of a pair of magnetic shield thin films. In this inter-shield gap, there are provided a magnetoresistive effect element and ferromagnetic films connected to both ends of the magnetoresistive effect element in the width direction. These magnetoresistive effect element and ferromagnetic films are partially exposed outward from a sliding surface against a magnetic recording medium. With respect to at least one of the pair of magnetic shield thin films, the width of the exposed portion is smaller than the sum of the width for a magnetoresistive effect element portion exposed from the sliding surface and the width for a ferromagnetic film portion exposed therefrom.

For a magnetoresistive effect magnetic head having the above-mentioned configuration according to the present invention, the magnetic shield thin film whose width is so determined as mentioned above can be effectively used as a marker for mounting the magnetoresistive effect magnetic head itself on a head support plate or a rotary drum.

With respect to this magnetoresistive effect magnetic head, the magnetic shield thin film is exposed from the media sliding surface for a width which is smaller than the sum of the width for a magnetoresistive effect element portion exposed from the sliding surface and the width for a ferromagnetic film portion exposed therefrom. The entire portion exposed from the sliding surface sufficiently fits into a visual field during image recognition. When mounting the magnetoresistive effect magnetic head on the head support plate or the rotary drum, it is possible to recognize the magnetic shield thin film portion exposed from the sliding surface as an image. Accurate positioning is available, for example, by measuring a distance from the end in the width direction to determine a position of the magnetoresistive effect element.

There may be the case where the magnetic shield thin film concenters on the magnetoresistive effect element in the width direction. Especially, in this case, it is possible to identify the center of the magnetic shield thin film in the width direction to be the center of the magnetoresistive effect element in the width direction, namely the track center for accurate positioning. At this time, it is also possible to recognize both ends of the magnetic shield thin film in the width direction exposed from the media sliding surface. Even if these ends are tapered, effects thereof can be nullified for properly measuring a distance. A distance to be measured is shortened, thus decreasing measurement errors for precision measurement and accurate positioning.

Another magnetoresistive effect magnetic head according to the present invention forms an inter-shield gap between joint surfaces for a pair of guard materials through the intermediation of a pair of magnetic shield thin films. In this inter-shield gap, there are provided a magnetoresistive effect element and ferromagnetic films connected to both ends of the magnetoresistive effect element in the width direction. These magnetoresistive effect element and ferromagnetic films are partially exposed outward from a sliding surface against a magnetic recording medium. A pair of notches is formed on at least one of the pair of magnetic shield thin films at its portion exposed from the sliding surface. A distance between these notches is smaller than the sum of the width for the magnetoresistive effect element portion exposed from the sliding surface and the width for the ferromagnetic film portion exposed therefrom.

For another magnetoresistive effect magnetic head having the above-mentioned configuration according to the present invention, a pair of notches is formed on the magnetic shield thin film at its portion which is exposed from the media sliding surface. The magnetic shield thin film can be effectively used as a marker for mounting the magnetoresistive effect magnetic head itself on a head support plate or a rotary drum.

As mentioned above, a pair of notches is formed at a portion where the magnetic shield thin film is exposed from the media sliding surface of the magnetoresistive effect magnetic head. A distance between these notches is smaller than the sum of the width for the magnetoresistive effect element portion exposed from the sliding surface and the width for the ferromagnetic film portion exposed therefrom. It is possible to sufficiently fit the entire portion between these notches into a visual field during image recognition. Accordingly, when mounting the magnetoresistive effect magnetic head on the head support plate or the rotary drum, it is possible to recognize the portion between the notches on the magnetic shield thin film as an image. Accurate positioning is available, for example, by measuring a distance from either notch to determine a position of the magnetoresistive effect element.

There may be the case where the center between the pair of notches matches the center of the magnetoresistive effect element in the width direction. Especially, in this case, it is possible to identify the center between these notches to be the center of the magnetoresistive effect element in the width direction, namely the track center for accurate positioning.

A rotary magnetic head apparatus according to the present invention comprises an apparatus body having a stationary drum and a rotary drum, and a magnetic reproducing head. The rotary drum is rotatively mounted against the fixed drum. The magnetic reproducing head is mounted at the rotary drum side of the body. On the rotary magnetic head apparatus, the magnetic reproducing head is provided with an inter-shield gap between joint surfaces of a pair of guard materials through the intermediation of a pair of magnetic shield thin films. In this inter-shield gap, there are provided a magnetoresistive effect element and ferromagnetic films connected to both ends of the magnetoresistive effect element in the width direction. These magnetoresistive effect element and ferromagnetic films are partially exposed outward from a sliding surface against a magnetic recording medium. With respect to at least one of the pair of magnetic shield thin films, the width of a portion thereof which is exposed from the sliding surface is smaller than the sum of the width for the magnetoresistive effect element portion exposed from the sliding surface and the width for the ferromagnetic film portion exposed therefrom.

A rotary magnetic head apparatus having the above-mentioned configuration according to the present invention is equipped with a magnetoresistive effect magnetic head as a magnetic reproducing head. The apparatus is applicable to a magnetic recording/reproducing system with high recording density. According to this rotary magnetic head apparatus, the magnetic reproducing head contains a magnetoresistive effect element. A magnetic shield thin film is narrower than the sum of the width for a magnetoresistive effect element portion exposed from the sliding surface and the width for a ferromagnetic film portion exposed therefrom. This magnetic shield thin film is used as a marker for accurately mounting the magnetic reproducing head on the rotary drum so that the magnetic reproducing head can appropriately read signals.

Another rotary magnetic head apparatus according to the present invention comprises an apparatus body having a stationary drum and a rotary drum, and a magnetic reproducing head. The rotary drum is rotatively mounted against the fixed drum. The magnetic reproducing head is mounted at the rotary drum side of the body. On the rotary magnetic head apparatus, the magnetic reproducing head is provided with an inter-shield gap between joint surfaces of a pair of guard materials through the intermediation of a pair of magnetic shield thin films. In this inter-shield gap, there are provided a magnetoresistive effect element and ferromagnetic films connected to both ends of the magnetoresistive effect element in the width direction. These magnetoresistive effect element and ferromagnetic films are partially exposed outward from a sliding surface against a magnetic recording medium. A pair of notches is formed on at least one of the pair of magnetic shield thin films at its portion exposed from the sliding surface. A distance between these notches is smaller than the sum of the width for the magnetoresistive effect element portion exposed from the sliding surface and the width for the ferromagnetic film portion exposed therefrom.

Another rotary magnetic head apparatus having the above-mentioned configuration according to the present invention is equipped with a magnetoresistive effect magnetic head as a magnetic reproducing head. The apparatus is applicable to a magnetic recording/reproducing system with high recording density. According to this rotary magnetic head apparatus, a pair of notches is formed on the magnetic shield thin film of the magnetic reproducing head. This magnetic shield thin film is used as a marker for accurately mounting the magnetic reproducing head on the rotary drum so that the magnetic reproducing head can appropriately read signals.

A manufacturing method for a rotary magnetic head according to the present invention relates to the manufacture of a rotary magnetic head apparatus which comprises an apparatus body having a stationary drum and a rotary drum, and a magnetic reproducing head. The rotary drum is rotatively mounted against the fixed drum. The magnetic reproducing head is mounted at the rotary drum side of the body. The magnetic reproducing head is provided with an inter-shield gap between joint surfaces of a pair of guard materials through the intermediation of a pair of magnetic shield thin films. In this inter-shield gap, there are provided a magnetoresistive effect element and ferromagnetic films connected to both ends of the magnetoresistive effect element in the width direction. These magnetoresistive effect element and ferromagnetic films are partially exposed outward from a sliding surface against a magnetic recording medium. With respect to at least one of the pair of magnetic shield thin films, the width of a portion thereof which is exposed from the sliding surface is smaller than the sum of the width for the magnetoresistive effect element portion exposed from the sliding surface and the width for the ferromagnetic film portion exposed therefrom. The manufacturing method is used for manufacturing such a magnetoresistive effect magnetic head having the above-mentioned configuration. The magnetic shield thin film is narrower than the sum of the width for the magnetoresistive effect element portion exposed from the sliding surface and the width for the ferromagnetic film portion exposed therefrom. The manufacturing method is characterized in that this magnetic shield thin film is used as a marker for mounting the magnetoresistive effect magnetic head on the rotary drum side of the body.

The manufacturing method for a rotary magnetic head apparatus according to the present invention makes it possible to accurately mount a magnetoresistive effect magnetic head as a magnetic reproducing head on a rotary drum.

Another manufacturing method for a rotary magnetic head apparatus according to the present invention relates to the manufacture of a rotary magnetic head apparatus which comprises an apparatus body having a stationary drum and a rotary drum, and a magnetic reproducing head. The rotary drum is rotatively mounted against the fixed drum. The magnetic reproducing head is mounted at the rotary drum side of the body. The magnetic reproducing head is provided with an inter-shield gap between joint surfaces of a pair of guard materials through the intermediation of a pair of magnetic shield thin films. In this inter-shield gap, there are provided a magnetoresistive effect element and ferromagnetic films connected to both ends of the magnetoresistive effect element in the width direction. These magnetoresistive effect element and ferromagnetic films are partially exposed outward from a sliding surface against a magnetic recording medium. A pair of notches is formed on at least one of the pair of magnetic shield thin films at its portion exposed from the sliding surface. A distance between these notches is smaller than the sum of the width for the magnetoresistive effect element portion exposed from the sliding surface and the width for the ferromagnetic film portion exposed therefrom. The manufacturing method is used for manufacturing such a magnetoresistive effect magnetic head having the above-mentioned configuration. The manufacturing method is characterized in that this magnetic shield thin film is used as a marker for mounting the magnetoresistive effect magnetic head on the rotary drum side of the body.

Another manufacturing method for a rotary magnetic head apparatus according to the present invention makes it possible to accurately mount a magnetoresistive effect magnetic head as a magnetic reproducing head on a rotary drum.

As mentioned above, the magnetoresistive effect magnetic head according to the present invention has the following feature. Namely, with respect to at least one of the pair of magnetic shield thin films, the width of a portion thereof which is exposed from the sliding surface is smaller than the sum of the width for the magnetoresistive effect element portion exposed from the sliding surface and the width for the ferromagnetic film portion exposed therefrom. The magnetic shield thin film portion exposed from the sliding surface can be effectively used as a marker for mounting the magnetoresistive effect magnetic head on a head support plate or a rotary drum with accurate positioning.

Another magnetoresistive effect magnetic head according to the present invention has the following feature. Namely, a pair of notches is formed on at least one of the pair of magnetic shield thin films at its portion exposed from the sliding surface. A distance between these notches is smaller than the sum of the width for the magnetoresistive effect element portion exposed from the sliding surface and the width for the ferromagnetic film portion exposed therefrom. The magnetic shield thin film positioned between the pair of notches can be effectively used as a marker for mounting the magnetoresistive effect magnetic head on a head support plate or a rotary drum with accurate positioning.

By having the above-mentioned magnetoresistive effect magnetic head as a magnetic reproducing head, the rotary magnetic head apparatus according to the present invention is applicable to a magnetic recording/reproducing system with high recording density. Additionally, since the magnetic reproducing head is accurately mounted on the rotary drum, the magnetic reproducing head can appropriately read signals.

The manufacturing method for a rotary magnetic head apparatus according to the present invention makes it possible to accurately mount the magnetoresistive effect magnetic head as a magnetic reproducing head on the rotary drum.

DETAILED DESCRIPTION OF THE INVENTION

Embodiments of the present invention will be described in detail, with reference to the accompanying drawings.

First Embodiment

Figure 1:
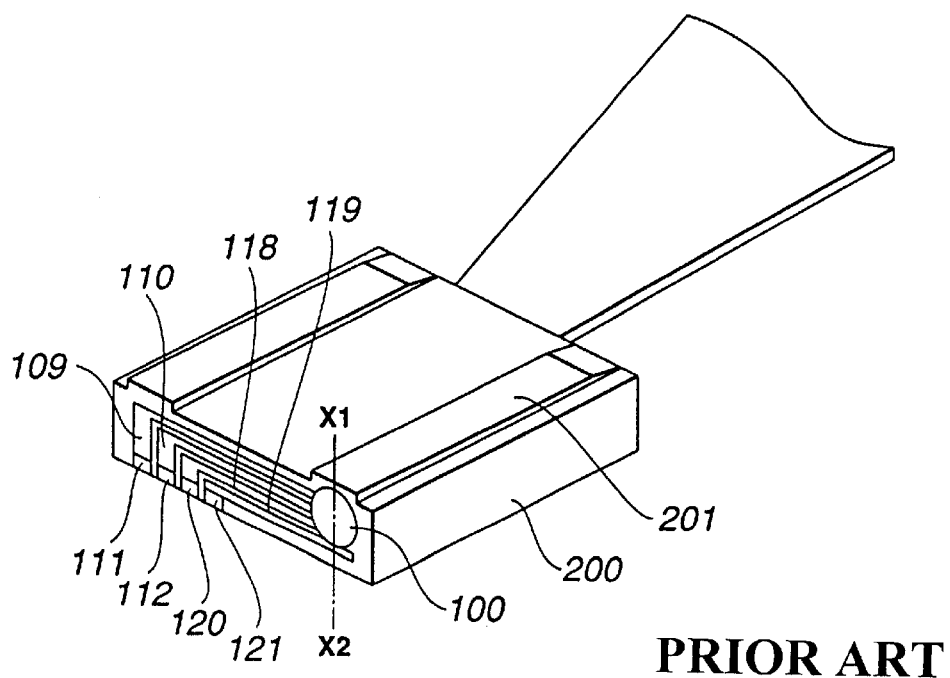
FIG. 1 is a perspective view of a conventional composite magnetic head, as an example, used for a hard disk drive, showing that the composite magnetic head is mounted on a floating slider.
Figure 2:
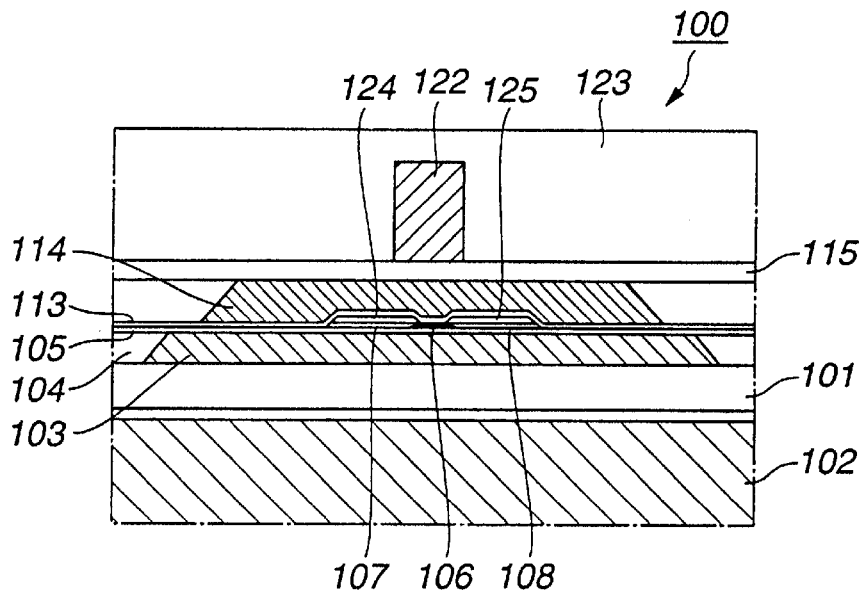
FIG. 2 is a partially enlarged top view of a conventional composite magnetic head, as an example, mounted on a floating slider and viewed from an air bearing surface.
Figure 3:
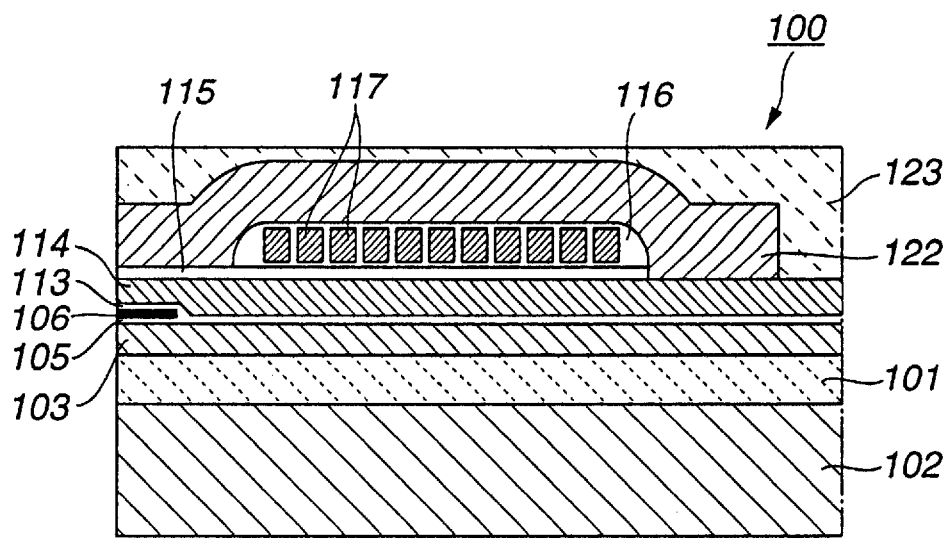
FIG. 3 is a cross-sectional view of a conventional composite magnetic head, as an example, taken in the line X1–X2 of FIG. 1.
Figure 4:
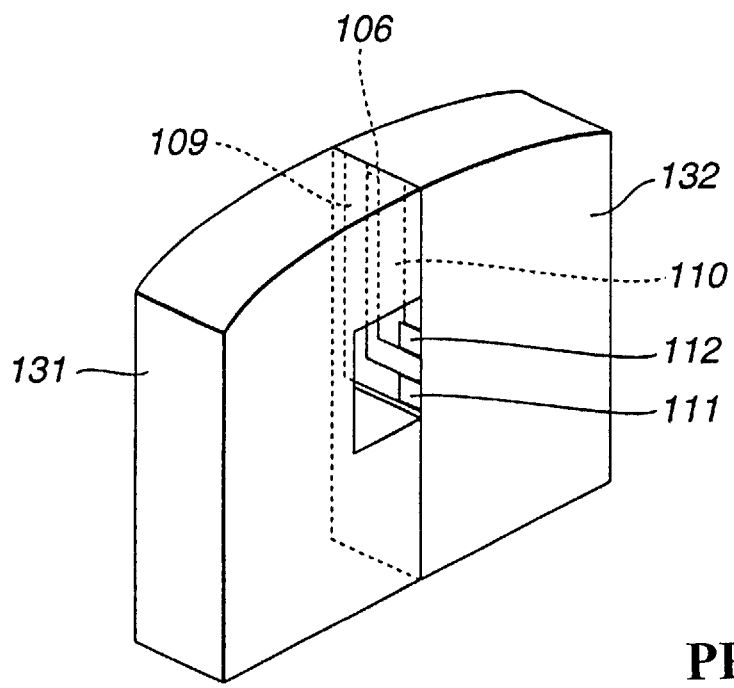
FIG. 4 is a perspective view of an MR head, as an example, configured as a reproducing head for a helical scan tape system.
Figure 5:
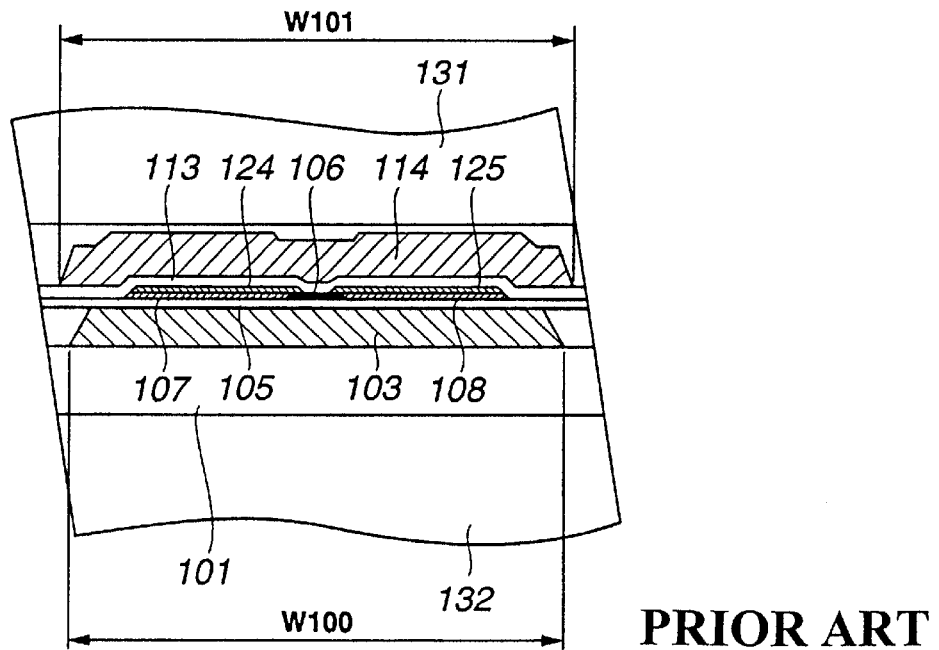
FIG. 5 is a partially enlarged top view of the MR head viewed from a tape sliding surface.
Figure 6:
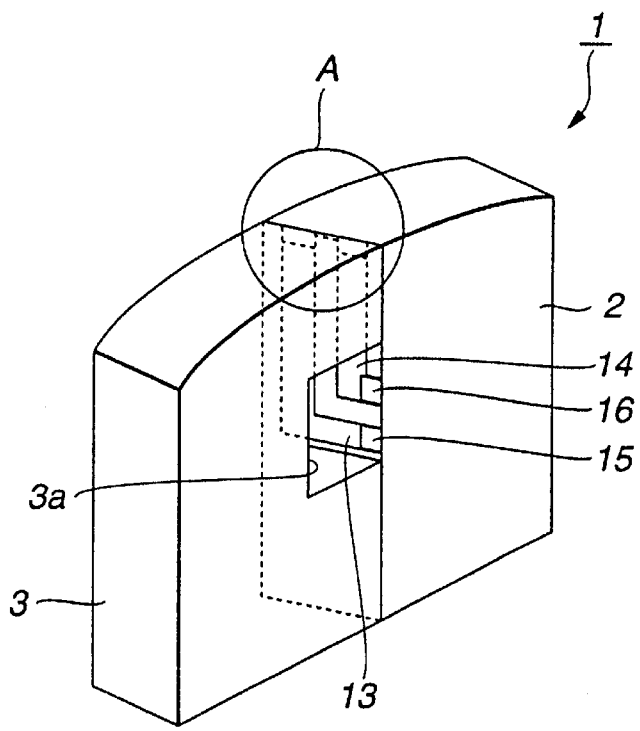
FIG. 6 is a perspective view of an MR head, as an example, according to the present invention.
Figure 7:
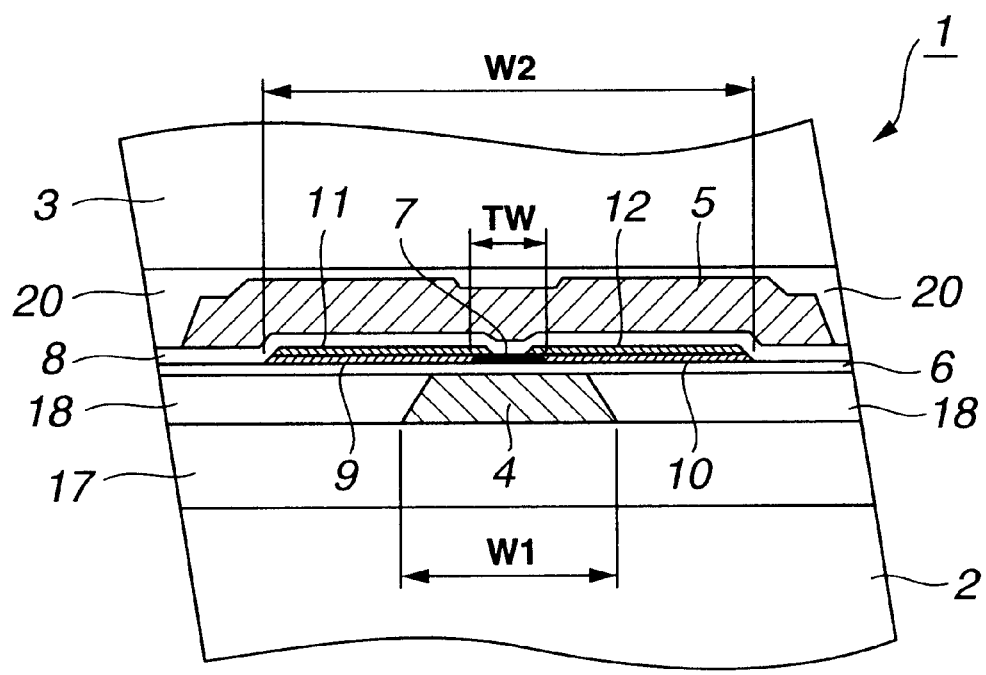
FIG. 7 is an enlarged top view of portion A in FIG. 6, viewed from the tape sliding surface.

FIGS. 6 and 7 show an example of a magnetoresistive effect magnetic head to which the present invention is applied. The magnetoresistive effect magnetic head (referred to hereafter as an MR head 1) shown in FIGS. 6 and 7 is configured as the so-called thin film shield-type MR head. In the MR head 1, a pair of integrated substrates 2 and 3 constitutes a pair of guard materials. Between joint surfaces for the pair of substrates 2 and 3, there are provided a first gap film 6, an MR element 7, and a second gap film 8 which are sandwiched between a pair of soft magnetic films (a lower magnetic shield thin film 4 and an upper magnetic shield thin film 5). The MR head 1 forms an inter-shield gap using a first gap film 6 and a second gap film 8 provided between the lower magnetic shield thin film 4 and the upper magnetic shield thin film 5. An MR element 7 is provided in the inter-shield gap.

The MR head 1 is provided with a pair of ferromagnetic films 9 and 10 adjacent to both ends of the MR element 7 in the width direction. These ferromagnetic films are used for making the MR element 7 to be single-domain and suppressing a Barkhausen noise. A pair of resistance decreasing films 11 and 12 is provided on the pair of ferromagnetic films 9 and 10. These resistance decreasing films are used for decreasing resistances of the MR element 7 and portions electrically connected to the MR element 7.

Further, the MR head 1 is provided with a pair of conductors 13 and 14 for supplying the MR element 7 with a sense current. These conductors are connected to the MR element 7 via a pair of ferromagnetic films 9 and 10. One end of the conductor 13 or 14 is exposed outward from an aperture 3a provided on the substrate 3. On one end of the outward exposed conductor 13 or 14, there are formed connection terminal 15 and 16 which are connected to external circuits.

An upper end face of the MR head 1 functions as a tape sliding surface 1a which slides touchingly across a magnetic tape as a recording medium. The tape sliding surface 1a is curved with a specified curvature for providing good conformity with the magnetic tape. In this MR head 1, an end face of the MR element 7 is exposed outward from the tape sliding surface 1a and functions as a magnetic sensor. The width of this end face is equivalent to a track width TW.

The MR head 1 forms a pair of ferromagnetic films 9 and 10 and a pair of resistance decreasing films 11 and 12 at both ends of the MR element 7 in the width direction. End faces of these films are exposed outward from the tape sliding surface 1a. End faces of the lower magnetic shield thin film 4 and the upper magnetic shield thin film 5 are also exposed outward from the tape sliding surface 1a.

In the figure, a width W1 signifies the width for an end face of the lower magnetic shield thin film 4 which is exposed outward from the tape sliding surface 1a. A width W2 corresponds to the sum of the width for an end face of the MR element 7 which is exposed outward from the tape sliding surface 1a and widths for end faces of a pair of ferromagnetic films 9 and 10 which are exposed outward from the tape sliding surface 1a. In the MR head 1, the width W1 is smaller than the width W2.

With respect to the width direction of the MR head 1, the MR element 7's end face exposed outward from the tape sliding surface 1a almost concenters on the lower magnetic shield thin film 4's end face exposed outward from the tape sliding surface 1a. Namely, the MR head 1 maintains an almost same distance: from the head side to the width-direction center of the lower magnetic shield thin film 4's end face exposed outward from the tape sliding surface 1a; and from the head side to the width-direction center of the MR element 7's end face exposed outward from the tape sliding surface 1a.

FIG. 6 is a perspective view of the MR head according to the present invention. FIG. 7 is an enlarged top view of portion A in FIG. 6, viewed from the tape sliding surface. FIGS. 6 and 7 show each component of the MR head 1 with proportions that differ from actual ones for easy understanding of features.

Figure 8:
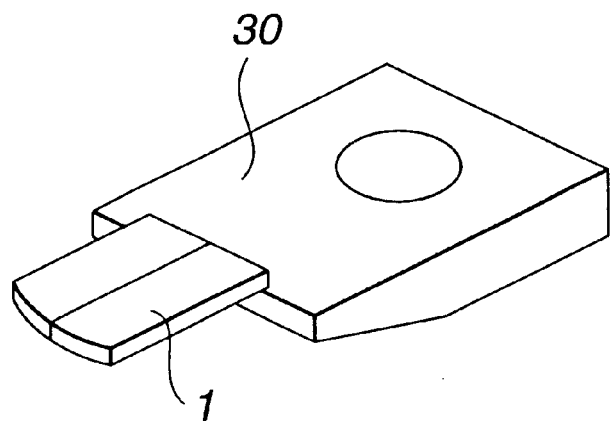
FIG. 8 is a perspective view, showing the MR head is mounted on a head support plate.

As shown in FIG. 8, the MR head 1 having the above-mentioned configuration is mounted on a head support plate 30 by using either side of the MR head 1 as an adhesive surface. The adhesive surface is provided with adhesives such as an ultraviolet hardening-type resin. Attached to the head support plate 30, the MR head 1 is mounted on a rotary magnetic head apparatus 40 as shown in FIG. 9.

Figure 9:
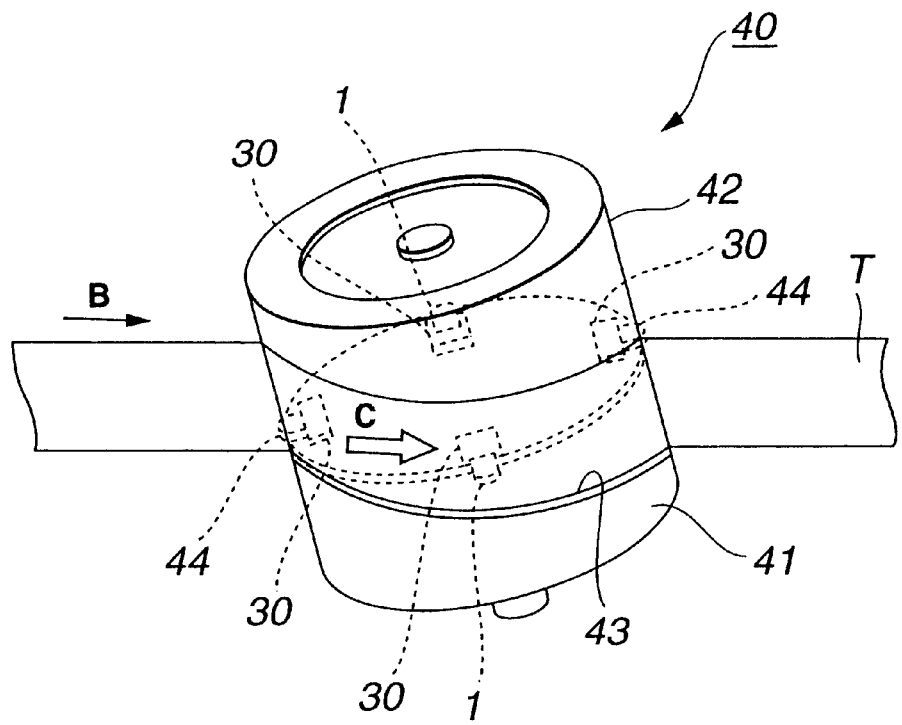
FIG. 9 is a perspective view of a rotary magnetic head apparatus, as an example, according to the present invention.

The rotary magnetic head apparatus 40 as shown in FIG. 9 is used for a recording/reproducing apparatus which is so configured as to record or reproduce signals from a magnetic tape T according to the helical scan technology. When the magnetic tape T is guided by a tape path system of the recording/reproducing apparatus, the magnetic head touchingly slides on the recording surface of the magnetic tape T to record signals onto the magnetic tape T. Alternatively, the magnetic head touchingly slides on the recording surface of the magnetic tape T having signals written thereon to read these signals from the magnetic tape T.

The rotary magnetic head apparatus 40 is formed almost cylindrically and comprises a stationary drum 41 and a rotary drum 42. The stationary drum 41 is fixed in the recording/reproducing apparatus. The rotary drum 42 is provided coaxially with the stationary drum 41 and is driven and rotated by a motor.

The stationary drum 41 is formed of a metal material such as aluminum with a specified thickness in an almost disk shape. A tape guide groove 43 is provided on the peripheral surface of the stationary drum 41 for guiding a wind of the magnetic tape T and maintaining its position. The tape guide groove 43 is formed with a specified inclination angle with reference to a direction perpendicular to a center axis of the stationary drum 41. The magnetic tape T is supported at its bottom by the tape guide groove 43 provided on the peripheral surface of the stationary drum 41. With this state, the magnetic tape T is wound on the peripheral surface of the rotary magnetic head apparatus 40.

Like the stationary drum 41, the rotary drum 42 is formed of a metal material such as aluminum with a specified thickness in an almost disk shape. The rotary drum 42 has a motor shaft inserted into its center and is driven and rotated by a motor.

The rotary drum 42 is provided with an inductive-type magnetic head 44 as a recording head for writing signals onto the magnetic tape T. The MR head 1 is mounted as a reproducing head for reading signals from the magnetic tape T where signals are written. These magnetic heads are supported by a head support substrate 30. With this state, these magnetic heads are mounted on the rotary drum 42 so that the corresponding tip of each head faces outward from the peripheral surface of the rotary magnetic head apparatus 40.

The rotary magnetic head apparatus 40 having the above-mentioned configuration is provided in the recording/ reproducing apparatus according to the helical scan technology. As shown in FIG. 9, the magnetic tape T is guided by the tape path system and moves in the direction of an arrow B. This tape is wound on the peripheral surface of the rotary magnetic head apparatus 40 at a wind angle of, say, 180 degrees. At this time, the magnetic tape T is wound along the tape guide groove 43 formed on the peripheral surface of the stationary drum 41. Accordingly, the tape is slantly wound on the peripheral surface of the rotary magnetic head apparatus 40.

The rotary drum 42 is rotatively operated with the magnetic tape T wound on the peripheral surface of the rotary magnetic head apparatus 40. As the rotary drum 42 rotates, the recording magnetic head 44 and the reproducing MR head 1 mounted on the rotary drum 42 move in the direction of an arrow C in FIG. 9 along the peripheral surface of the rotary magnetic head apparatus 40. These heads slantly and touchingly slide on the recording surface of the magnetic tape T wound on the peripheral surface of the rotary magnetic head apparatus 40. This operation writes signals to or reads signals, if any, from the signal recording surface of the magnetic tape T.

There may be the case where the MR head 1 is used as a reproducing head for the rotary magnetic head apparatus 40. In such a case, the MR head 1 must be accurately mounted on the head support substrate 30 so that the MR element 7 as a magnetic sensor is positioned optimally. Further, it is necessary to accurately mount the head support substrate 30 equipped with the MR head 1 on the rotary drum 42 so that the MR element 7 is positioned optimally.

With respect to the MR head 1 as mentioned above, the width W1 signifies the width for the end face of the lower magnetic shield thin film 4 which is exposed outward from the tape sliding surface 1a. The width W2 corresponds to the sum of the width for the end face of the MR element 7 which is exposed outward from the tape sliding surface 1a and widths for end faces of a pair of ferromagnetic films 9 and 10 which are exposed outward from the tape sliding surface 1a. It is assumed that the width W1 is smaller than the width W2. It is possible to properly mount the MR head 1 on the head support plate 30 and the rotary drum 42.

Namely, the MR head 1 has the small width W1 for the lower magnetic shield thin film 4's end face exposed outward from the tape sliding surface 1a. This exposed end face can be entirely fit into a visual field during image recognition. Accordingly, it is possible to easily recognize the MR element 7's position by previously determining a positional relationship between the lower magnetic shield thin film 4 and the MR element 7.

Especially, with respect to the width direction of the MR head 1, the MR element 7's end face exposed outward from the tape sliding surface 1a almost concenters on the lower magnetic shield thin film 4's end face exposed outward from the tape sliding surface 1a. After detecting a width-direction center of the lower magnetic shield thin film 4's end face exposed outward from the tape sliding surface 1a, this center can be identified as a width-direction center of the MR element 7's end face exposed outward from the tape sliding surface 1a, namely the track center. This center position can be used as a reference for accurate positioning.

The lower magnetic shield thin film 4 has the end face exposed outward from the tape sliding surface 1a. The entire end face fits into a visual field during image recognition. It is possible to recognize both ends of the end face at a time. Even if these ends are tapered, effects thereof can be nullified for properly measuring a distance and detecting the track center. A distance to be measured is shortened, thus decreasing measurement errors for precision measurement and accurate positioning.

The MR head 1 having the above-mentioned features is manufactured in the following process. First, there is provided the substrate 2 of Al—TiC or the like for manufacturing the MR head 1. On the substrate 2, a nonmagnetic nonconductive film 17 of $Al_2O_3$ and the like is formed with a thickness of several micrometers for flattening the surface.

A soft magnetic film of Sendust and the like is formed by means of sputtering and the like on the substrate 2 where the nonmagnetic nonconductive film 17 is formed. The soft magnetic film is then etched to a specified shape to form the lower magnetic shield thin film 4. At this time, the soft magnetic film is etched so that the width W1 is smaller than the width W2 when the MR head 1 is finally completed. The width W1 means the width for the end face of the lower magnetic shield thin film 4 which is exposed outward from the tape sliding surface 1a. The width W2 corresponds to the sum of the width for the end face of the MR element 7 which is exposed outward from the tape sliding surface 1a and widths for end faces of a pair of ferromagnetic films 9 and 10 which are exposed outward from the tape sliding surface 1a.

The nonmagnetic nonconductive film 17 formed on the substrate 2 includes a region where no lower magnetic shield thin film 4 is formed, namely where the soft magnetic film is removed due to etching. In this region, a nonmagnetic nonconductive film 18 of $Al_2O_3$ and the like is embedded with the same thickness as the lower magnetic shield thin film 4.

Figure 10:
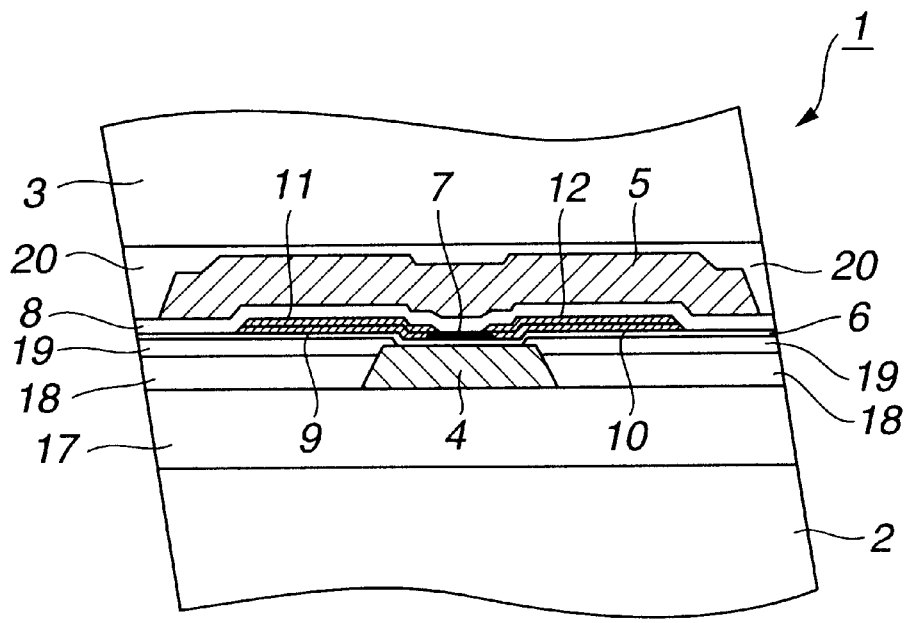
FIG. 10 is a partially enlarged plan view of another MR head according to the present invention, viewed from the tape sliding surface.

If the thickness of the nonmagnetic nonconductive film 18 differs from the thickness of the lower magnetic shield thin film 4, a step is formed on a boundary between these films. When such a step is formed, an electrical short circuit may occur between the lower magnetic shield thin film 4 and a pair of ferromagnetic films 9 and 10. For preventing this electrical short circuit, it is effective to form an additional nonmagnetic nonconductive film 19 as shown in FIG. 10 after embedding the nonmagnetic nonconductive film 18. At this time, the additional nonmagnetic nonconductive film 19 should cover the boundary between the nonmagnetic nonconductive film 18 and the lower magnetic shield thin film 4.

A sputtering process or the like is used to form a nonmagnetic nonconductive film of $Al_2O_3$ and the like on the substrate 2 where the lower magnetic shield thin film 4 and the nonmagnetic nonconductive film 18 are formed. This nonmagnetic nonconductive film functions as the first gap film 6.

The MR element 7 according to, say, the SAL (Soft Adjacent Layer) biasing method is formed on the nonmagnetic nonconductive film of $Al_2O_3$ and the like functioning as the first gap film 6. The SAL biasing MR element 7 is a lamination of an SAL bias layer, an intermediate layer, and an MR layer. It should be noted that the MR element 7 is not limited to this SAL biasing configuration.

A pair of ferromagnetic films 9 and 10 is formed at both ends of the MR element 7 in the width direction on the nonmagnetic nonconductive film of $Al_2O_3$ and the like functioning as the first gap film 6. These ferromagnetic films are used for making the MR element 7 to be single-domain and suppressing a Barkhausen noise. A pair of resistance decreasing films 11 and 12 is provided on the pair of ferromagnetic films 9 and 10. These resistance decreasing films are used for decreasing resistances of the MR element 7 and portions electrically connected to the MR element 7.

A pair of conductors 13 and 14 for supplying the MR element 7 with a sense current is formed on the nonmagnetic nonconductive film of $Al_2O_3$ and the like functioning as the first gap film 6. These conductors should be connected to the MR element 7 via a pair of ferromagnetic films 9 and 10.

A sputtering process or the like is used to form a nonmagnetic nonconductive film of $Al_2O_3$ and the like so that it covers the MR element 7, the ferromagnetic films 9 and 10, the resistance decreasing films 11 and 12, and the conductors 13 and 14. This nonmagnetic nonconductive film functions as the second gap film 8.

Then, a sputtering process or the like is used to form a soft magnetic film of amorphous alloy and the like on the nonmagnetic nonconductive film of $Al_2O_3$ and the like which functions as the second gap film 8. The soft magnetic film is etched to a specified shape to form the upper magnetic shield thin film 5.

Then, a nonmagnetic nonconductive film of $Al_2O_3$ and the like is formed so as to cover the upper magnetic shield thin film 5. The nonmagnetic nonconductive film is flattened on it surface through the use of diamond lapping and is formed to a protective film 20.

The second gap film 8 and the protective film 20 are formed on ends opposite to the side where a pair of conductors 13 and 14 is connected to the MR element 7. These films are etched to be removed. On ends of a pair of outward exposed conductors 13 and 14, copper and the like is formed by, say, plating with the thickness of several tens of micrometers to form a pair of connection terminals 15 and 16.

An adhesive or the like is used to bond and unify the substrate 3 of Al—TiC and the like on the substrate 2 where the above-mentioned elements are formed. Finally, cylindrical polishing is applied to an upper end face as the tape sliding surface 1a to complete the MR head 1.

The MR head 1 manufactured as mentioned above is mounted on the head support plate 30 by adjusting the MR element 7 as a magnetic sensor to an optimal position. At this time, a mounting procedure uses as a marker the end face exposed outward from the tape sliding surface 1a of the lower magnetic shield thin film 4.

The head support plate 40 equipped with the MR head 1 is mounted on the rotary drum 42 by adjusting the MR element 7 in the MR head 1 to an optimal position. At this time, a mounting procedure uses as a marker the end face exposed outward from the tape sliding surface 1a of the lower magnetic shield thin film 4 in the MR head 1.

Figure 11:
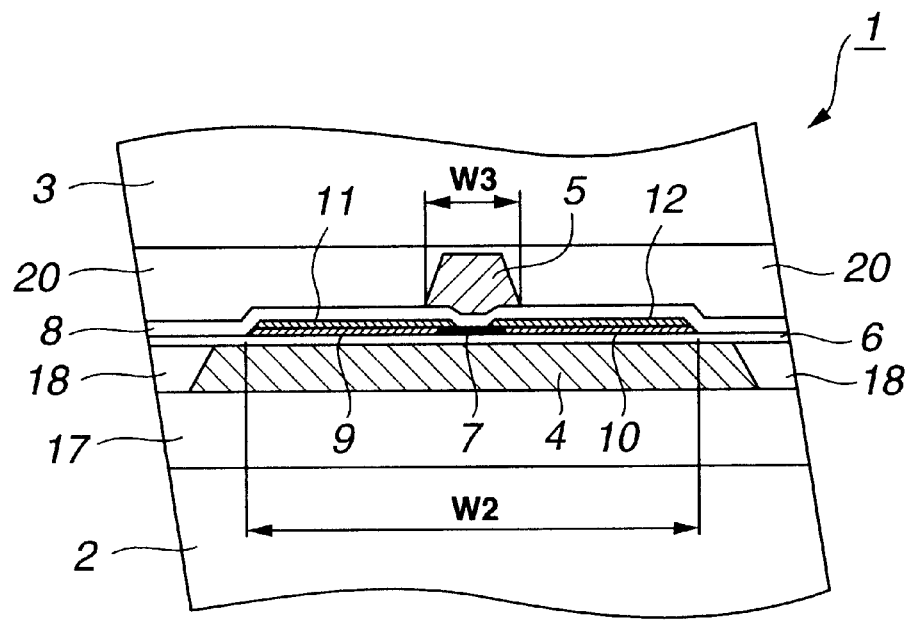
FIG. 11 is a partially enlarged plan view of still another MR head according to the present invention, viewed from the tape sliding surface.

In the above-mentioned example, the width W1 is smaller than the width W2. Namely, the width W1 means the width for the end face of the lower magnetic shield thin film 4 exposed outward from the tape sliding surface 1a. The width W2 corresponds to the sum of the width for the end face of the MR element 7 which is exposed outward from the tape sliding surface 1a and widths for end faces of a pair of ferromagnetic films 9 and 10 which are exposed outward from the tape sliding surface 1a. This example uses as a marker the end face exposed outward from the tape sliding surface 1a of the lower magnetic shield thin film 4. The present invention is not limited to the above-mentioned example. For example, as shown in FIG. 11, a width W3 denotes the width for an end face of the upper magnetic shield thin film 5 which is exposed outward from the tape sliding surface 1a. The width W2 corresponds to the sum of the width for the end face of the MR element 7 which is exposed outward from the tape sliding surface 1a and widths for end faces of a pair of ferromagnetic films 9 and 10 which are exposed outward from the tape sliding surface 1a. In this case, W3 may be smaller than W2. The upper magnetic shield thin film 5's end face exposed outward from the tape sliding surface 1a may be used as a marker.

Figure 12:
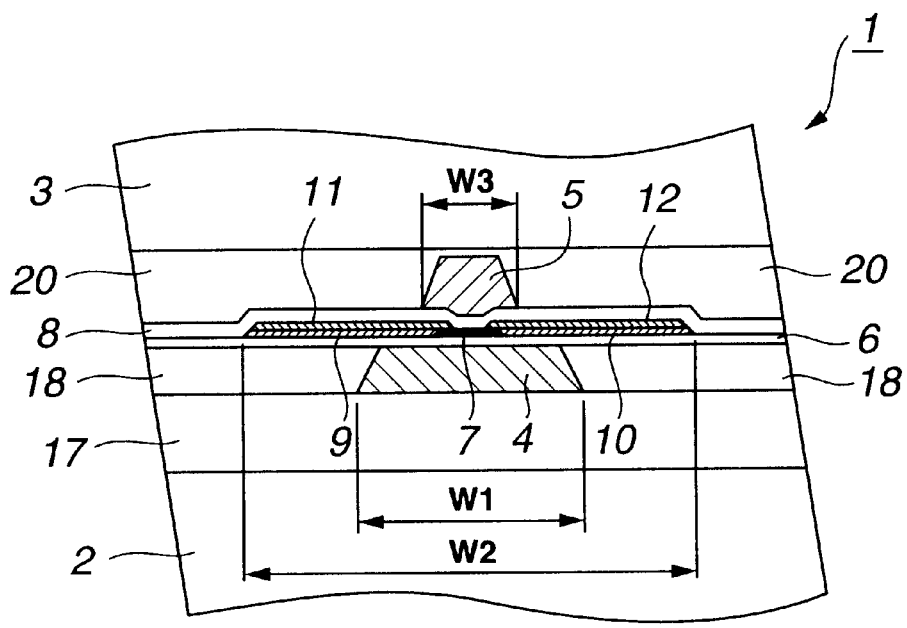
FIG. 12 is a partially enlarged plan view of yet another MR head according to the present invention, viewed from the tape sliding surface.

As shown in FIG. 12, the width W1 indicates the width for the end face of the lower magnetic shield thin film 4 which is exposed outward from the tape sliding surface 1a. The width W3 denotes the width for an end face of the upper magnetic shield thin film 5 which is exposed outward from the tape sliding surface 1a. The width W2 corresponds to the sum of the width for the end face of the MR element 7 which is exposed outward from the tape sliding surface 1a and widths for end faces of a pair of ferromagnetic films 9 and 10 which are exposed outward from the tape sliding surface 1a. In this case, W1 or W3 may be smaller than W2. As a marker, it may be possible to selectively use the lower magnetic shield thin film 4's end face or the upper magnetic shield thin film 5's end face each of which is exposed outward from the tape sliding surface 1a.

Second Embodiment

Figure 13:
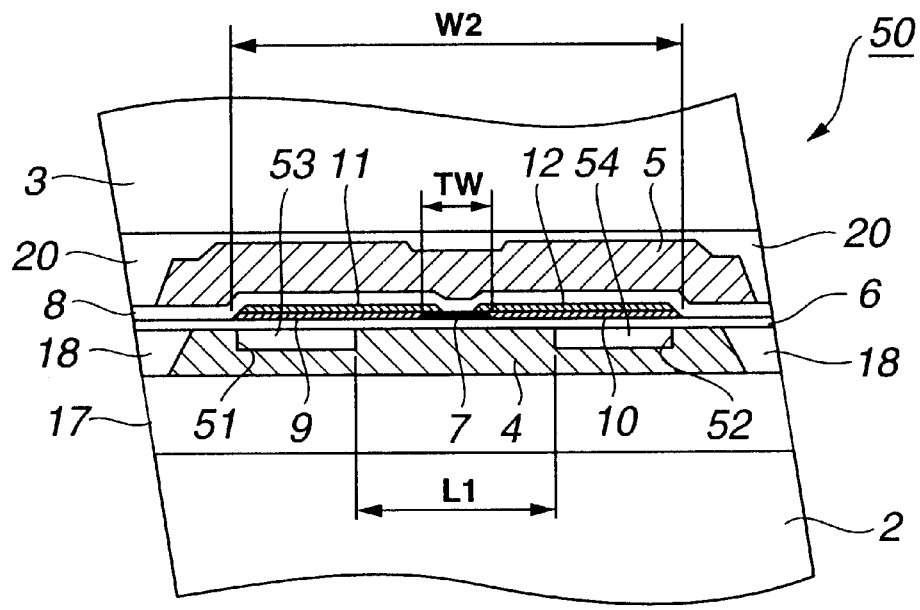
FIG. 13 is a partially enlarged plan view of still yet another MR head according to the present invention, viewed from the tape sliding surface.

FIG. 13 shows another example of the magnetoresistive effect magnetic head to which the present invention is applied. The magnetoresistive effect magnetic head (referred to hereafter as an MR head 50) shown in FIG. 13 is configured as the so-called thin film shield-type MR head. The basic configuration is same as for the MR head 1 of the first embodiment. The MR head 50 has a pair of notches 51 and 52 formed on the lower magnetic shield thin film 4 for using this film as a marker. In the following description, same parts as in the first embodiment are assigned the same numerals. The description thereof is omitted.

A pair of notches 51 and 52 is necessary for using the lower magnetic shield thin film 4 as a marker. These notches are formed as follows. First, a photoresist layer having an aperture is formed on the lower magnetic shield thin film 4 which is formed via the nonmagnetic nonconductive film 17 on the substrate 2. This photoresist layer is used as a mask for ion milling and the like. This process etches the lower magnetic shield thin film 4 at a location where the photoresist layer's aperture is formed. Finally, the etching process forms a pair of notches 51 and 52 measuring 0.2 μm or more deep.

A pair of notches 51 and 52 is filled with nonmagnetic nonconductive materials 53 and 54 of $Al_2O_3$ and the like. A step is formed at a boundary between the lower magnetic shield thin film 4 and nonmagnetic nonconductive materials 53 and 54. There may occur an electrical short circuit between the lower magnetic shield thin film 4 and a pair of ferromagnetic films 9 and 10. Like the MR head 1 as shown in FIG. 10, it is effective to form an additional nonmagnetic nonconductive film so as to cover the boundary between the lower magnetic shield thin film 4 and the nonmagnetic nonconductive materials 53 and 54.

A location where the photoresist layer aperture is formed determines where a pair of notches 51 and 52 should be formed. When the MR head 50 is finally completed, a pair of notches 51 and 52 is exposed outward from the tape sliding surface. A distance between these notches is assumed to be L1. The width W2 corresponds to the sum of the width for the end face of the MR element 7 which is exposed outward from the tape sliding surface and widths for end faces of a pair of ferromagnetic films 9 and 10 which are exposed outward from the tape sliding surface. The pair of notches 51 and 52 is formed so that L1 becomes smaller than W2.

In the MR head 50, a pair of notches 51 and 52 is formed so that the MR element 7 almost concenters on the lower magnetic shield thin film 4 located between a pair of notches 51 and 52 with respect to the width direction of the MR head 50. Namely, the MR head 50 maintains an almost same distance: from the head side to the width-direction center of the lower magnetic shield thin film 4 located between a pair of notches 51 and 52; and from the head side to the width-direction center of the MR element 7.

Like the MR head 1 according to the first embodiment, the MR head 50 having the above-mentioned configuration is mounted on a head support plate 30 by using either side of the MR head 1 as an adhesive surface. The adhesive surface is provided with adhesives such as an ultraviolet hardening-type resin. Attached to the head support plate 30, the MR head 50 is mounted on the rotary magnetic head apparatus 40 as shown in FIG. 9.

With respect to the MR head 50 as mentioned above, L1 means the distance between a pair of notches 51 and 52 formed on the lower magnetic shield thin film 4. The width W2 corresponds to the sum of the width for the MR element 7's end face exposed outward from the tape sliding surface 1a and widths for end faces of a pair of ferromagnetic films 9 and 10 which are exposed outward from the tape sliding surface 1a. It is assumed that L1 is smaller than W2. It is possible to use as a marker the end face of the lower magnetic shield thin film 4 located between a pair of notches 51 and 52 for properly mounting the MR head 50 on the head support plate 30 and the rotary drum 42.

Namely, the MR head 50 has the small distance L1 between a pair of notches 51 and 52 formed on the lower magnetic shield thin film 4. A visual field during image recognition can cover the entire end face of the lower magnetic shield thin film 4 located between a pair of notches 51 and 52. Accordingly, it is possible to easily recognize the MR element 7's position by previously determining a positional relationship between the MR element 7 and a pair of notches 51 and 52.

Especially, with respect to the width direction of the MR head 50, the MR element 7 almost concenters on the lower magnetic shield thin film 4 located between a pair of notches 51 and 52. After detecting a width-direction center of the lower magnetic shield thin film 4's end face located between a pair of notches 51 and 52, this center can be identified as a width-direction center of the MR element 7's end face, namely the track center. This center position can be used as a reference for accurate positioning.

Figure 14:
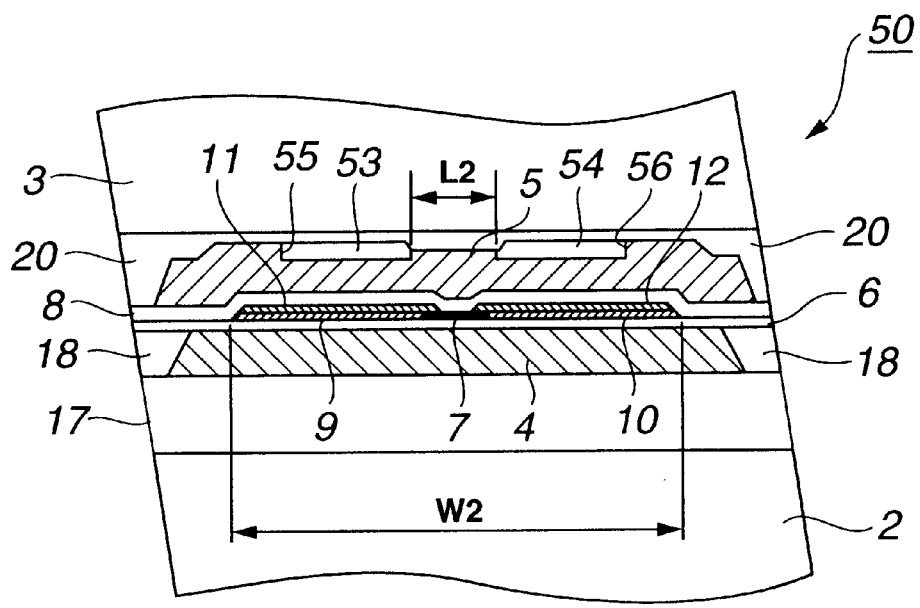
FIG. 14 is a partially enlarged plan view of yet still another MR head according to the present invention, viewed from the tape sliding surface.

In the above-mentioned example, a pair of notches 51 and 52 is formed on the lower magnetic shield thin film 4. This example uses as a marker the end face of the lower magnetic shield thin film 4 located between the pair of notches 51 and 52. The present invention is not limited to the above-mentioned example. For example, as shown in FIG. 14, a pair of notches 55 and 56 may be formed on the upper magnetic shield thin film 5. A distance between these notches is assumed to be L2. The width W2 corresponds to the sum of the width for the MR element 7's end face exposed outward from the tape sliding surface and widths for end faces of a pair of ferromagnetic films 9 and 10 which are exposed outward from the tape sliding surface. In this case, L2 may be smaller than W2. As a marker, it may be possible to use the end face of the upper magnetic shield thin film 5 located between the pair of notches 55 and 56.

Figure 15:
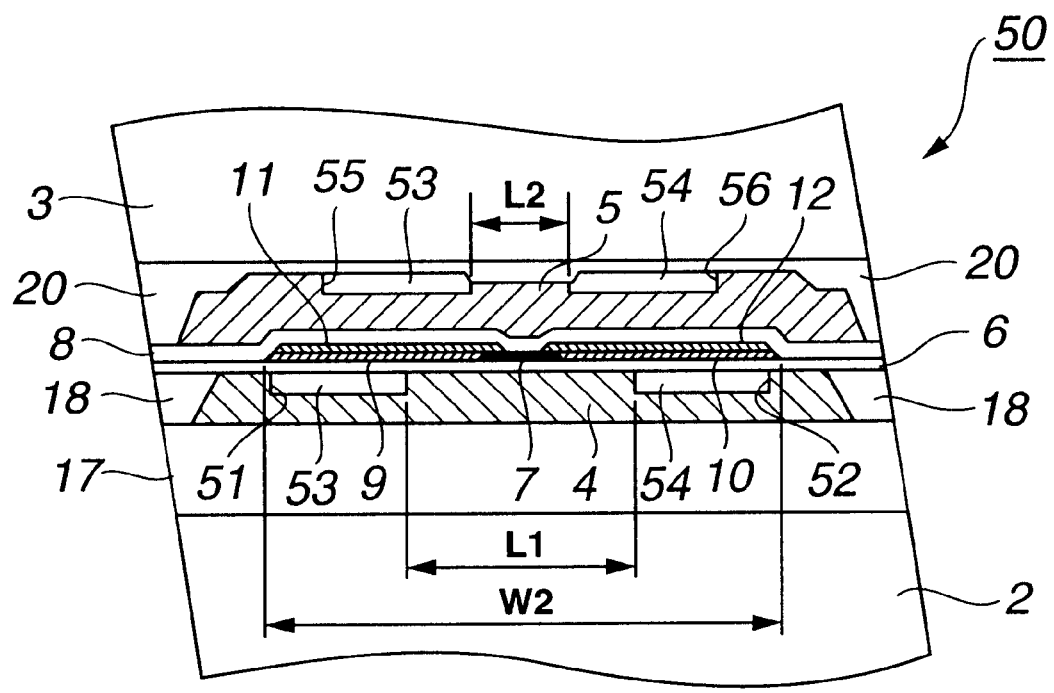
FIG. 15 is a partially enlarged plan view of still yet another MR head according to the present invention, viewed from the tape sliding surface.

As shown in FIG. 15, a pair of notches 51 and 52 is formed on the lower magnetic shield thin film 4. A distance between these notches is assumed to be L1. The width W2 corresponds to the sum of the width for the MR element 7's end face exposed outward from the tape sliding surface and widths for end faces of a pair of ferromagnetic films 9 and 10 which are exposed outward from the tape sliding surface. It is assumed that L1 is smaller than W2. Further, a pair of notches 55 and 56 is formed on the upper magnetic shield thin film 5. A distance between these notches is assumed to be L2. It is assumed that L2 is smaller than W2. As a marker, it may be possible to selectively use the lower magnetic shield thin film 4's end face located between a pair of notches 51 and 52 or the upper magnetic shield thin film 5's end face located between a pair of notches 55 and 56.

What is claimed is:

1. A method of manufacturing a rotary magnetic head apparatus comprising an apparatus body having a stationary drum and a rotary drum rotatively provided with reference to the stationary drum, and a magnetic reproducing head mounted on a rotary drum side of the apparatus body, wherein said magnetic reproducing head is manufactured as a magnetoresistive effect magnetic head, by forming an inter-shield gap between joint surfaces for a pair of guard materials through the intermediation of a pair of magnetic shield thin films, and arranging a magnetoresistive effect element and a ferromagnetic film connected to both ends of the magnetoresistive effect element in a width direction between the inter-shield gap, in such a manner that the magnetoresistive effect element and the ferromagnetic film are partially exposed outward from a sliding surface against a magnetic recording medium, the pair of magnetic shield thin films is partially exposed from the sliding surface, and the width for an exposed portion of at least one of these magnetic shield thin films is smaller than the sum of a width of said magnetoresistive effect element portion exposed from said sliding surface and a width of said ferromagnetic film portion exposed therefrom, and said magnetoresistive effect magnetic head is mounted on a rotary drum side of said apparatus body by using as a marker said magnetic shield thin film whose width is smaller than the sum of a width of said magnetoresistive effect element portion exposed from said sliding surface and the width of said ferromagnetic film portion exposed therefrom.

* * * * *